United States Patent [19]
Kreusel

[11] 4,312,905

[45] Jan. 26, 1982

[54] HEAT-DAMMING COMPOUND PROFILE

[76] Inventor: Ulrich Kreusel, Schlosstrasse 14, 6531 Gensingen, Fed. Rep. of Germany

[21] Appl. No.: 132,904

[22] Filed: Mar. 24, 1980

[30] Foreign Application Priority Data

Mar. 26, 1979 [DE] Fed. Rep. of Germany ....... 2911832

[51] Int. Cl.[3] .......................... B32B 3/02; B32B 3/06; B32B 3/08

[52] U.S. Cl. ...................................... 428/122; 52/235; 52/393; 52/397; 52/403; 52/741; 52/788; 428/164; 428/188; 428/192; 428/358

[58] Field of Search ................. 52/393, 741, 397, 403, 52/788, 235; 428/31, 34, 122, 164, 188, 192, 217, 358; 49/490, 492

[56] References Cited

U.S. PATENT DOCUMENTS

| | | | |
|---|---|---|---|
| 3,978,629 | 9/1976 | Echols, Sr. | 52/235 |
| 4,074,490 | 2/1978 | Nagase | 52/397 |

FOREIGN PATENT DOCUMENTS

| | | |
|---|---|---|
| 2102505 | 8/1972 | Fed. Rep. of Germany . |
| 2115154 | 10/1972 | Fed. Rep. of Germany . |
| 2130496 | 12/1972 | Fed. Rep. of Germany . |
| 2412317 | 9/1974 | Fed. Rep. of Germany . |
| 2531267 | 1/1977 | Fed. Rep. of Germany . |

*Primary Examiner*—William J. Van Balen
*Attorney, Agent, or Firm*—Max Fogiel

[57] ABSTRACT

A heat-damming compound profile for window or door frames or similar components in which there is provided two metal profile rods and an intermediate layer connecting these profile rods. The intermediate layer is composed of a profiled shape-retaining insulating strip. Each profile bar is provided with a forcible guide for the insulating strip and are connected by oppositely located lugs outside the insulating strip. Each lug is provided with a small continuous cam which is movable against a corresponding projection of the insulating strip. The invention also provides a method of making a heat-damming compound profile by pushing the insulating strip into the forcible guides and into the lateral pins of the profile bars, and exerting pressure from the exterior by means of rollers or pressure gliders upon the metallic lugs at simultaneous directed support of the profile bars at the sides opposite the lugs.

12 Claims, 3 Drawing Figures

HEAT-DAMMING COMPOUND PROFILE

BACKGROUND OF THE INVENTION

The invention relates to a heat-damming compound profile, particularly for window or door frames or similar components, which consists of two metal profile rods and an intermediate layer connecting these profile rods and composed of a profiled shape-retaining insulating strip.

A method for making a compound profile is known from German DE-OS No. 2 412 317 which has two metal partial profiles and a heat insulating intermediate layer connecting these partial profiles which in turn consists of two profiled shape-retaining insulating strips with an intermediate layer arranged between these and exerting pressure upon them; the intermediate layer is installed as a pre-formed component and the pressure in the intermediate layer is produced by permanent expansion of the intermediate layer. The intermediate layer is elastically compressed by external pressure upon the insulating elements and in this compressed condition the intermediate layer is installed, whereupon the tensioning is effected by releasing of the internal pressure upon the insulating layer strips and the thus resulting elastic expansion of the intermediate layer. The intermediate layer thus acts via the insulating strips upon the partial profiles to obtain the desired connection, but due to a differential expansion of the intermediate layer this may lead to a non-exact maintenance of the overall profile depth and also to a relative shifting of the two partial profiles with reference to one another.

Furthermore, a thermally insulated compound, particularly for window and door frames is described in the German DE-OS No. 2 115 154, having two metal profile bars which respectively have anchoring flanges extending into recesses of a synthetic plastic intermediate profile, with the synthetic plastic intermediate profile having on one side a longitudinal groove which receives one each transverse arm of the anchoring flanges and an elastic thermally insulating filling strip located between them; these are received with a clamping action and at the other side the intermediate profile is supported against abutment means of the metal profile bars. In this compound profile the sensitive thermally insulating filler strip is located without protection between the two metal profile bars, and moreover two separate insulating parts are needed to connect the metal profile bars, namely the synthetic plastic intermediate profile and the filler strip.

From the German DE-OS No. 2 102 505 a heat-damming compound profile is known, particularly for window frames, which is composed of two profile bars connected with one another with the interposition of a heat-damming layer. One of these is tensioned with a C-shaped profile part about a T-shaped profile part of the other and the heat-damming layers, whereby the heat-damming layer is composed in cross-section of soft and hard parts and the hard cross-sectional parts serve in at least one direction of transmitting of forces between the T-shaped and the C-shaped profile part, whereas the soft parts are arranged in the tension direction. Such a compound profile is relatively expansive because of the required differential hardeners of the heat-damming layer, in terms of manufacturing costs.

Further, from the German No. 2 531 267 a thermally insulating aluminum profile is known for window and door manufacture which consists of an outer and an inner profile and in which for the purpose of interrupting the cold bridge rubber profiles and a vacuum hose are provided. The insulating strips are, seen in cross-section, essentially U-shaped and engage with their arms into corresponding grooves of the profile bars. The insulating body is supported under stress only against the opposite profile bars and to connect the profiles three separate components are necessary.

The German DE-OS No. 2 130 496 describes a window with a metallic cover and/or casement frame in which each bar of the frame extending transversely to the window plane is interrupted by a heat insulating strip formed with projections which matingly cooperate with associated projections of the adjacent frame parts. The strip parts engaging behind the projections of the frame parts can snap elastically behind the respectively associated projections. Two outer and two inner spring bodies are used as the elastic insulating bodies.

Finally, a heat-damming compound profile is known which is composed of two metal profile bars and an intermediate layer connecting these profile bars. The intermediate layer is composed of two profiled shape-retaining insulating strips and the insulating strips are of U-shaped construction and engage with their arms into appropriate grooves of the profile bars after appropriate pressing of associated lugs of the profiles. The pressing of the lugs of the profiles against the insulating strips must be carried out between the oppositely located insulating strips, which on the one hand requires a substantial machinery expenditure and on the other hand permits a relative shifting of the profile bars.

SUMMARY OF THE INVENTION

It is the task of the present invention to eliminate the disadvantages existing in the state of the art and to provide a heat-damming compound profile which combines easy installation with an exact overall profile depth, and beyond this excludes a relative movement of the profile bars to be connected during the installation.

This task is solved in accordance with the invention in that each profile bar is provided with a forcible guide for the insulating strip, and that the profile bars are provided with oppositely located lugs outside the insulating strip connecting the profile bars, which can be pressed against the insulating strip.

In a further embodiment of the invention each lug is provided at its side facing towards the insulating strip with a small continuous cam which is movable against a corresponding projection of the insulating strip.

To increase the security of the connection between the two profile bars a further concept of the invention provides for the insulating bar to have lateral, inclined guides which extend in the direction of the lugs of the profile bars and into which corresponding lateral pins of the profile bars engage, with the inner width of the guides being greater than the thickness of the pins.

To avert back tension in non-suitable construction of the tips by the lateral guides in the insulating strip each pin of the profile bars is provided, as seen in the direction of the lugs of the profile bars, with a continuous cam at its free end and also at the juncture with the associated profile bar with a flattening. The height of the pins corresponds to the projected width of the flattening.

The insulating strip is preferably provided at its upper side with a nose located between the lugs of the profile bars and which prevents possibly forming water of condensation on the upper side of the insulating bars from becoming deposited in a continuous layer, which would form a cold bridge. Further, the insulating strip is provided at its underside with the forcible guides of the profile rods for the insulating strip, which nose is usable as an abutment and serves as sound protection and to avoid cold radiation.

The invention further embraces a method of making a heat-damming compound profiles, utilizing the previously described profile bars with associated insulating strip, which is characterized in that the insulating strip is pushed into the forcible guides and onto the lateral pins of the profile bars, and that subsequently pressure is exerted from the exterior by means of rollers, pressure gliders or similar devices upon the metallic lugs on the profile bars, at simultaneous directed support of the profile bars on the sides opposite the lugs, whereby these lugs are pushed in the direction towards the insulating strip and the insulating strip is now in tight engagement with the lateral edges of the lateral pins, so that the insulating strip forms a firm connection between the profile bars under maintenance of an exact overall profile depth as well as under avoidance of a relative movement of the profile bars relative to one another.

The advantages obtained with the invention consist particularly in that based upon the play existing between the incline guides and the lateral pins the insulating strip can be pushed without significant friction losses into the profile bars, and that after the pressing of the lugs an excellent heat-damming stable compound profile is obtained which permits an exact miter connection, because during the manufacture neither the overall profile depth nor the relatively association of the inner and outer profile bars changes. Due to the initially present play larger manufacturing tolerances can finally adjust themselves without any difficulties.

The compound profile according to the invention is described in more detail in the following description, based upon two exemplary embodiments which are illustrated in detail in the drawing.

DESCRIPTION OF THE PREFERRED EMBODIMENTS

Figure 1:
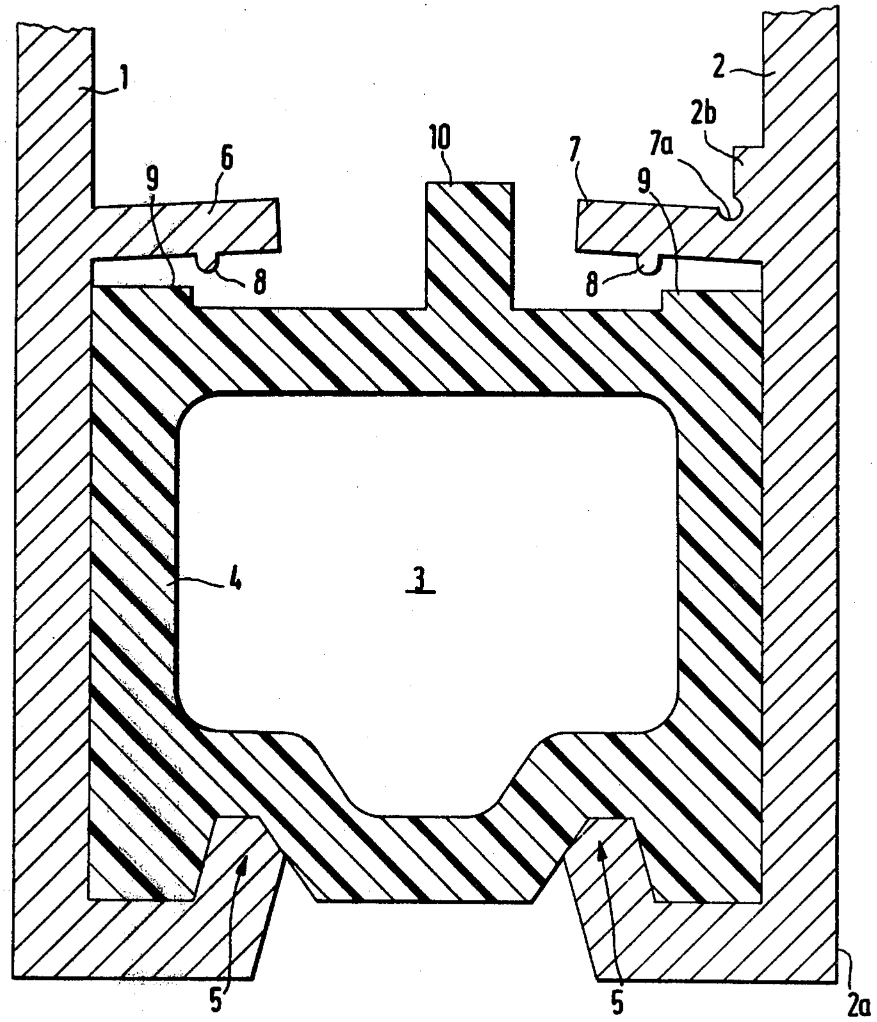
FIG. 1 shows a compound profile according to an embodiment of the invention in a not yet complete assembled condition, FIG. 2 a compound profile according to a further embodiment of the invention in a not yet fully assembled condition and FIG. 3 a cross section through a window leaf and a window frame with a respectively installed compound profile according to FIG. 2.

Each compound profile is composed of the metallic inner profile bar 1 and the metallic outer profile bar 2 as well as the profiled shape-retaining insulating strip 4 which is formed with a hollow space 3 and consists of any desired shape-retaining synthetic plastic. Each profile bar 1, 2 has at its lower end a forcible guide 5 for the insulating strip 4. Outside the insulating strip 4 connecting them, the profile bars 1, 2 are provided with oppositely located lugs 6, 7 at the underside of which there is respectively profiled a continuous cam 8 associated with a corresponding projection 9 of the insulating strip 4. During the manufacturing method the cams 8 are pressed against the corresponding projections 9 of the insulating strip 4 by depressing of the lugs 6, 7 in order to obtain a durable connection of the individual components with one another. To avoid a damage to the anodized layer on the viewable surface 2*a* of the outer profile 2 during the depressing of the lug 7, the thickness of the lug 7 is thinner on the one hand than the thickness of the outer profile 2 and on the other hand in the region of the connection between outer profile 2 and lugs 7 an intended-bend area 7*a* is provided. To avoid a weakening of the outer profile 2 in the region of its intended-bend area 7*a* the inner side of the profile 2 is formed with a reinforcement 2*b* of one part with the outer profile 2. The insulating strip 4 has at its upper side a nose 10 located between the lugs 6, 7 of the profile bars 1,2.

Figure 2:
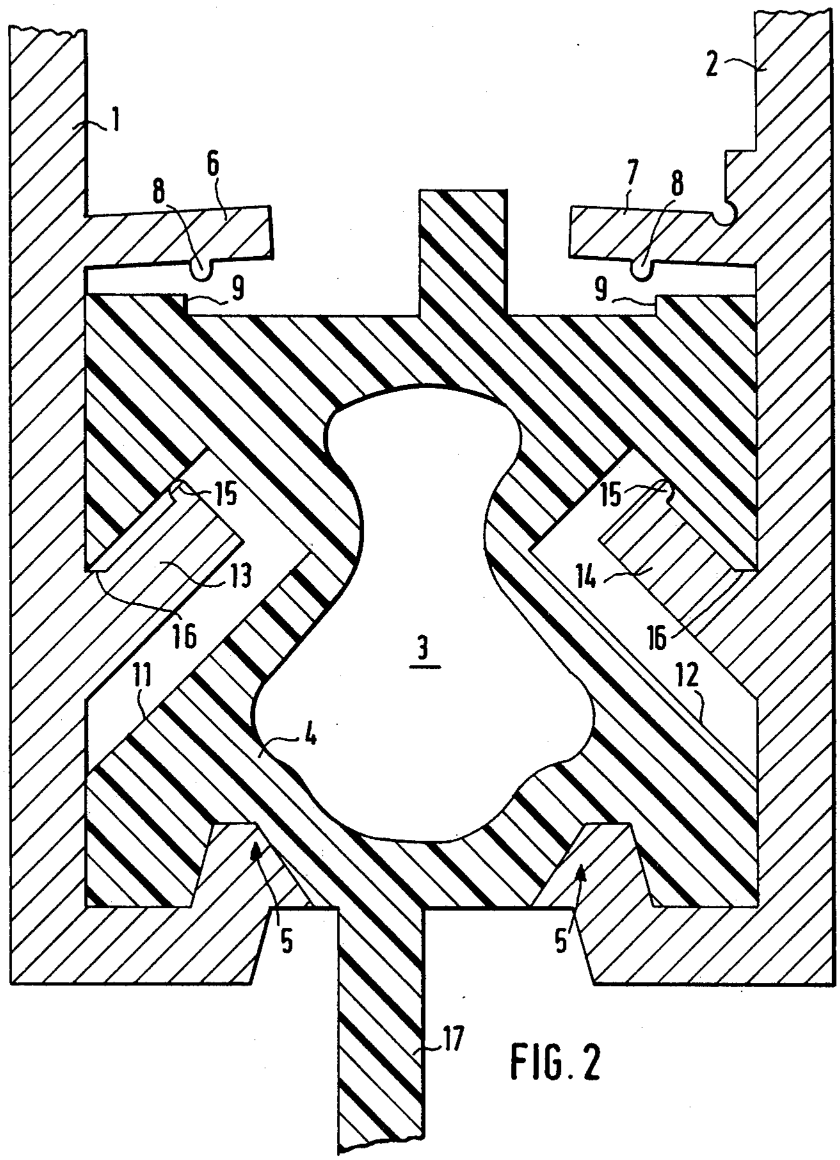
Figure 3:
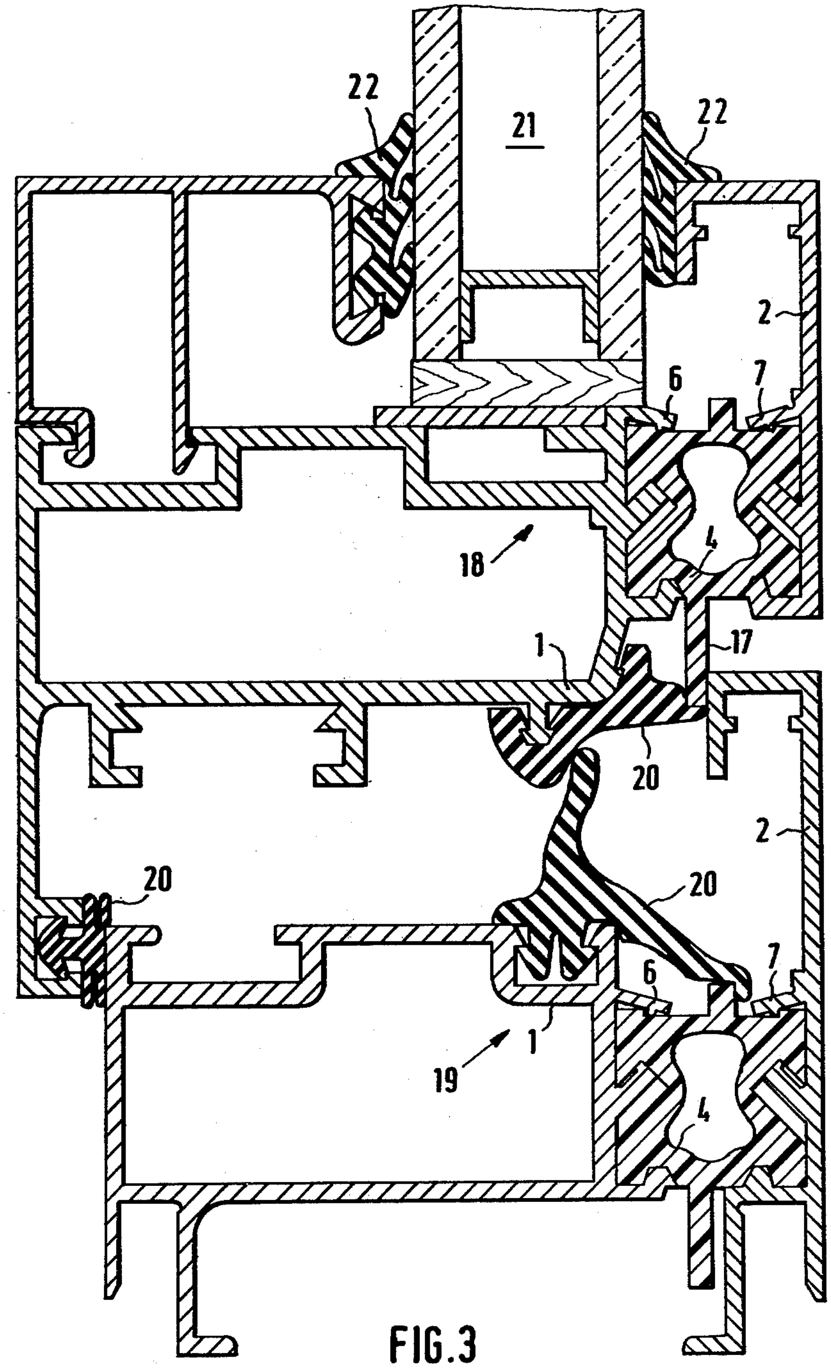

According to the embodiment in FIG. 2 the insulating strip 4 also has, at two opposite sides, guides 11, 12 which extend inclined into the interior of the strip and into which lateral pins 13, 14 of the profile bars 1, 2 extend. The inner width of the inclined guides 11, 12 is greater than the thickness of the lateral pins 13, 14. The difference of the inner width of incline guides and the thickness of the lateral pins is preferably equal to the distance through which the outer edges of the lugs 6, 7 on the profile bars 1, 2 are bent in direction towards the insulating strip 4 during the manufacturing operation, as seen in the direction of the force component acting by the lugs towards the insulating strip 4. Each pin 13, 14 of the profile bars is provided at its free end in the direction towards the lugs 6, 7 with a continuous cam 15. Further, each pin 13, 14 is provided at its junction with the corresponding profile bar 1, 2 facing towards the lugs 6, 7 with a flattening 16 the projected width corresponds to the height of the cams 15. Further, the insulating strip 4 is provided at its underside with a nose 17 located between the forcible guides 5 of the profile bars 1, 2 for the insulating strip 4, which nose serves as an abutment when the compound profile is used as a window leaf 18, for the appropriate window frame 19. Window leaf 18 and window frame 19 are connected with one another by appropriate rubber seals 20. Furthermore, the window pane 21 is mounted in the window leaf 18 via appropriate seals 22.

I claim:

1. Heat-damming compound profile, particularly for window or door frames or similar structural parts, comprising: metal profiled bars; an intermediate layer connecting said profiled bars and comprising a profiled shape-retaining insulating strip; each profiled bar having a forcible guide for said insulating strip; said profiled bars being provided outside the insulating bar to opposite located lugs, said lugs being pressable against said insulating strip.

2. Compound profile as defined in claim 1, wherein each lug has at its side facing said insulating strip a small continuous cam; said cam being movable against a corresponding projection of said insulating strip.

3. Compound profile as defined in claim 1, including guides recessed in said insulating strip laterally thereof; said guides being inclined and extending in the direction of said lugs of said profile bars; corresponding lateral pins of said profile bars engaging said guides, the inner width of said guides being greater than the thickness of said pins.

4. Compound profile as defined in claim 1, wherein each pin of said profile bars has in the direction of said lugs of said profile bars a continous cam at its free end and has a flattening at the junction with the associated profile bar.

5. Compound profile as defined in claim 4, wherein the height of said cam of said pins corresponds to the projected width of said flattening.

6. Compound profile as defined in claim 1, wherein said insulating strip has at its upper side a nose located between said lugs of said profile bars.

7. Compound profile as defined in claim 1, wherein said insulating strip has at its under side a nose between the forcible guides of said profile bars for said insulating strip for use as an abutment.

8. Compound profile as defined in claim 1, wherein outside said insulating strip a hollow space is provided.

9. Compound profile as defined in claim 1, wherein the thickness of said lug is smaller than the thickness of said outer profile.

10. Compound profile as defined in claim 1, including a location in the region of the connection between outer profile and a lug for intended bends.

11. Compound profile as defined in claim 10 including a reinforcement in the region of said intended-bend location at the inner side of said outer profile, said reinforcement being of one piece with said outer profile.

12. Method for making a heat-damming compound profile as defined in claim 1, comprising the steps of: pushing an insulating strip into forcible guides and onto lateral pins of profile bars; exerting pressure from the exterior upon metallic lugs on said profile bars; exerting said pressure at simultaneous directed support of said profile bars at sides opposite said lugs; and pushing said lugs in the direction towards said insulating strip so that said insulating strip comes into tight engagement with lateral edges of said lateral pins.

* * * * *